J. C. GASTON.
Churn Dasher.

No. 64,969. Patented May 21, 1867.

WITNESSES:

INVENTOR:
J. C. Gaston

United States Patent Office.

J. C. GASTON, OF CINCINNATI, OHIO.

*Letters Patent No. 64,969, dated May 21, 1867.*

ATMOSPHERIC CHURN-DASHER.

The Schedule referred to in these Letters Patent and making part of the same.

TO ALL WHOM IT MAY CONCERN:

Be it known that I, J. C. GASTON, of Cincinnati, Hamilton county, and State of Ohio, have invented a new and improved buoyant Atmospheric Churn-Dash, of which the following is a full and clear description thereof, reference being had to the accompanying drawings making part of this specification.

My improvement in churn-dashes relates to the dash-board or plate constructed with an annular concavity in its lower face, and having a central perforation through which passes the tubular handle, which is open at the bottom and closed at the top, immediately beneath which is the circular opening, which may be closed by the hand, and at the will of the operator.

Figures 1, 2:
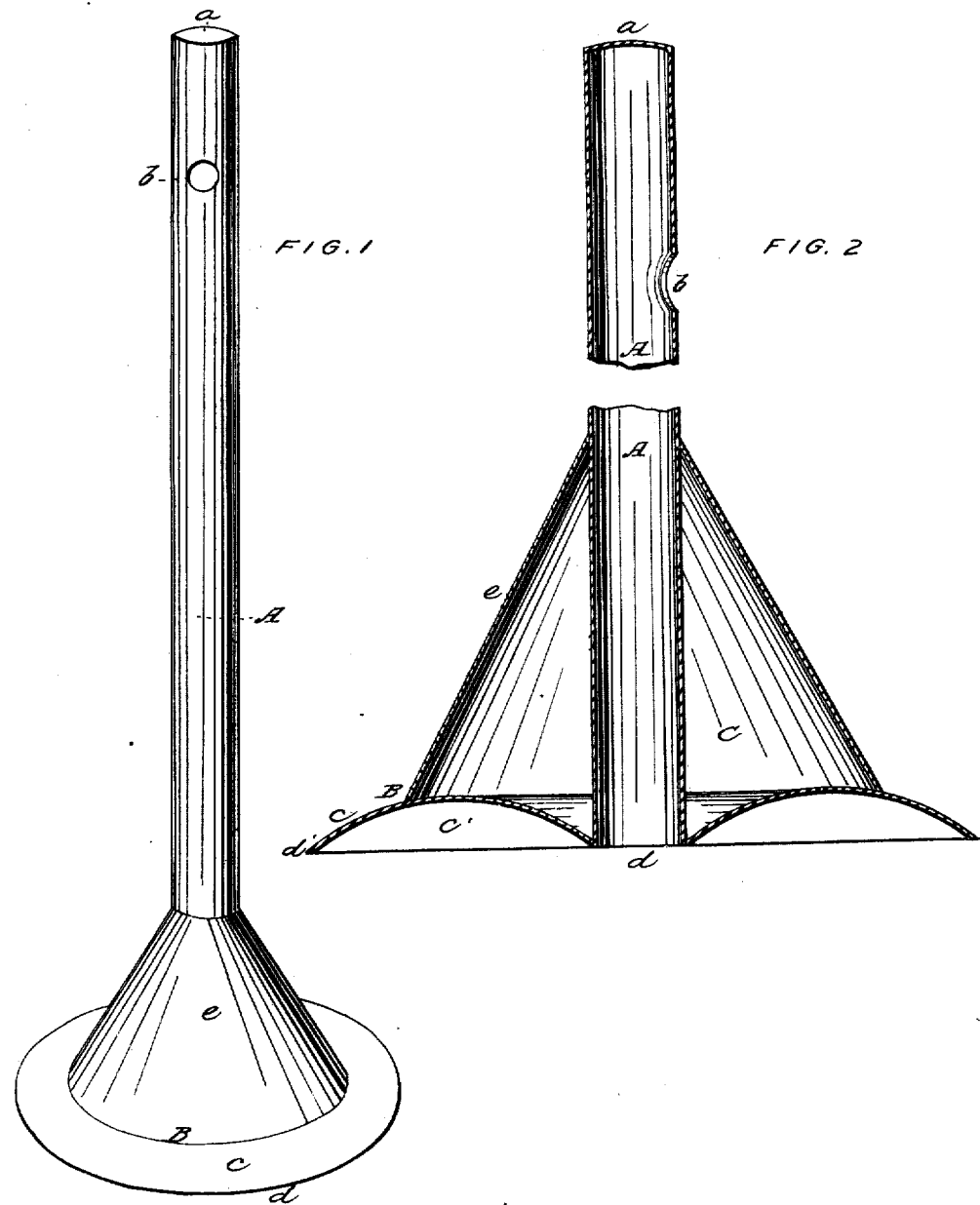
Figure 1 represents a perspective view of my improved churn-dash.
Figure 2 is a transverse sectional view of the same.

A is the tubular handle of the churn-dash. It is closed at its outer end $a$, and open at $d$, its inner end, where it is secured to the dash-board $c$ of the churn-dash B. A perforation, $b$, is made in the tubular handle A at a short distance below the outer end $a$. The perforation may be of any shape, with a diameter less than the width of the handle in which it is made. B is the churn-dash, which is secured to the tubular handle A at its inner end $d$. The dash-board $c$ of the churn-dash B is constructed with an annular concavity, $c'$, in its lower face. The concavity $c'$ is symmetrically located about the inner end $d$ of the tubular handle A. The edge $d'$ of the dash-board $c$ is the limit outwardly of the concavity $c'$. A tight air-chamber, C, is enclosed by securing the conical or other shaped wall $e$ to the dash-board $c$ of the churn-dash B, and the tubular handle A. The tubular handle A passes directly through the chamber C, and is secured to the edge of the centrally located opening in the dash-board $c$ of the churn-dash B at $d$.

The churn-dash herein described is adapted for use in all sized barrel-churns. In using it, the operator grasps the end of the tubular handle A with one hand in such a position as to cover the perforation $b$; the churn-dash B is then forced down into the milk, and carries with it the air confined in the annular concavity $c'$, and also that in the lower end of the tubular handle A. This confined air will be caused to commingle with the milk when a quick reciprocating motion is imparted to the churn-dash. In elevating the churn-dash B, the operator removes from over the perforation $b$ the hand which covers it in the downward descent of the churn-dash, and permits a fresh supply of air to pass down through the handle A to find its way as before into the body of the milk. This mode of introducing air into the milk causes a less violent destruction of the sacks containing the globules of butter than that usually adopted, and the butter is thereby left in a better condition for speedy collection.

What I claim as my invention, and desire to secure by Letters Patent, is—

The tubular handle A, provided with the perforation $b$, near the upper end $a$, in combination with the dash-board $c$, having the annular concavity $c'$ in its lower face, all constructed and operating substantially as herein described and for the purpose set forth.

J. C. GASTON.

Witnesses:
C. L. FISHER,
WILLIAM R. McCOMAS.